United States Patent
Tourn et al.

(10) Patent No.: US 8,738,612 B1
(45) Date of Patent: May 27, 2014

(54) RESOLVING AMBIGUOUS QUERIES

(75) Inventors: Michel A. Tourn, New York, NY (US);
Robert S. Renaud, New York, NY (US)

(73) Assignee: Google Inc., Mountain View, CA (US)

( * ) Notice: Subject to any disclaimer, the term of this patent is extended or adjusted under 35 U.S.C. 154(b) by 70 days.

(21) Appl. No.: 13/192,299

(22) Filed: Jul. 27, 2011

(51) Int. Cl.
*G06F 17/30* (2006.01)

(52) U.S. Cl.
CPC ............................... *G06F 17/30554* (2013.01)
USPC ........... 707/723; 707/727; 707/731; 707/732; 707/733; 707/734

(58) Field of Classification Search
CPC .................................................. G06F 17/30554
See application file for complete search history.

(56) References Cited

U.S. PATENT DOCUMENTS

| | | | |
|---|---|---|---|
| 2008/0172362 A1* | 7/2008 | Shacham et al. | 707/3 |
| 2010/0138413 A1* | 6/2010 | Wu et al. | 707/732 |
| 2011/0040752 A1* | 2/2011 | Svore et al. | 707/728 |
| 2011/0078127 A1* | 3/2011 | Lin et al. | 707/706 |
| 2012/0096033 A1* | 4/2012 | Shah et al. | 707/780 |
| 2013/0054569 A1* | 2/2013 | Mo et al. | 707/722 |

OTHER PUBLICATIONS

Deng et al., "Entropy-biased Models for Query Representation on the Click Graph", SIGIR'09, Jul. 19-23, 2009, Boston, Massachusetts, USA, 8 pages.

* cited by examiner

*Primary Examiner* — Anh Tai Tran
(74) *Attorney, Agent, or Firm* — Bracewell & Giuliani LLP (57) ABSTRACT

Methods, systems, and apparatus for resolving ambiguous queries. A search query is received and metrics are identified for the query that are associated with respective categories. Each metric indicates a user preference for search results that are responsive to the query and associated with the metric's respective category. The identified metrics are used to determine whether the query is ambiguous. Responsive to determining that the query is ambiguous, the identified metrics are used to determine a user preference for one or more categories of search results responsive to the ambiguous query. Search results associated with the one or more user preferred categories are ranked higher than search results that are not associated with the one or more user preferred categories.

18 Claims, 5 Drawing Sheets

RESOLVING AMBIGUOUS QUERIES

TECHNICAL FIELD

This specification relates to textually ambiguous queries.

BACKGROUND

Search queries are used in various contexts to identify information from a collection of information. For example, a query can be used to search a database of records. In another example, a query is input by a user of a web browser to transmit a search request to a search engine to search information that is available to the user over the world wide web. In another example, a user of a mapping application that provides a graphical display of geographic information (i.e., a map) may input a query to search for a particular geographic location and/or point of interest. Although users of such searching techniques may be considerably experienced, or not, in crafting queries, the nature of human languages leaves room for ambiguity. For example, a search term can have multiple meanings that are vastly different and that can each yield vastly different search results, some of which may be responsive to the user's query, but others of which will be highly unresponsive and therefore distracting to the user.

SUMMARY

In general, one aspect, the subject matter described in this specification can be embodied in methods that include receiving a search query and identifying, for the query, metrics associated with respective categories. Each metric indicates a user preference for search results that are responsive to the query and associated with the metric's respective category. The identified metrics are used to determine whether the query is ambiguous. Responsive to determining that the query is ambiguous, the identified metrics are used to determine a user preference for one or more categories of search results responsive to the ambiguous query. Search results associated with the one or more user preferred categories are ranked higher than search results that are not associated with the one or more user preferred categories. Other embodiments of this aspect include corresponding systems, apparatus, and computer programs recorded on computer storage devices, each configured to perform the actions of the methods.

These and other embodiments can each optionally include one or more of the following features, alone or in combination. The metric for each category can be a click-through-rate determined from historical data for search results previously presented to users in response to queries that match the received query. Using the identified metrics to determine whether the query is ambiguous can include determining whether any of the categories has a metric value that exceeds the metric values of all of the other categories by a predetermined amount. Using the metrics to determine whether the query is ambiguous can include determining whether the entropy of the metrics exceeds a predetermined value. Determining a user preference for one or more categories of search results responsive to the ambiguous query can include determining whether one or more of the identified metrics exceeds a predetermined value. Determining a user preference for one or more categories of search results responsive to the ambiguous query can include listing the identified metrics in decreasing numerical order, determining whether a drop-off that is greater than a predetermined value exists between any two metrics in the list, and responsive to such a drop-off existing, identifying categories associated with metrics occurring before the drop-off as user preferred categories.

Particular embodiments of the subject matter described in this specification can be implemented so as to realize one or more of the following advantages. A query can be identified as ambiguous, and if so, information that relates to the query can be used in an attempt to determine categories of search results that are most likely preferred. When a search term has more than one meaning, the various meanings being vastly different from each other, the techniques and systems described can help to eliminate (or at least downgrade) search results that are most likely related to categories that are not relevant to the particular meaning of the search term intended by the user. A user that input the search query can thereby be provided with more responsive search results and less distracted by the inclusion of highly unresponsive search results. A user can avoid losing time trying to reformulate a query by adding disambiguating terms, which in term may degrade search results in any event.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Search queries can include terms that have more than one meaning. A search engine processing the search query can provide vastly different search results, depending on which meaning is attributed to the word in the search query. By way of illustrative example, a search query for POOL can yield search results that relate to swimming pools, pool tables or establishments where one can play pool, e.g., a sports lounge. Such a search query is therefore ambiguous because the meaning of the search term is open to more than one interpretation. Metrics recording user interactions with search results previously presented in response to search queries can be used to both identify ambiguous search queries, and to rank search results provided in response to ambiguous search queries to reflect user preferences for such search results.

Figure 1:
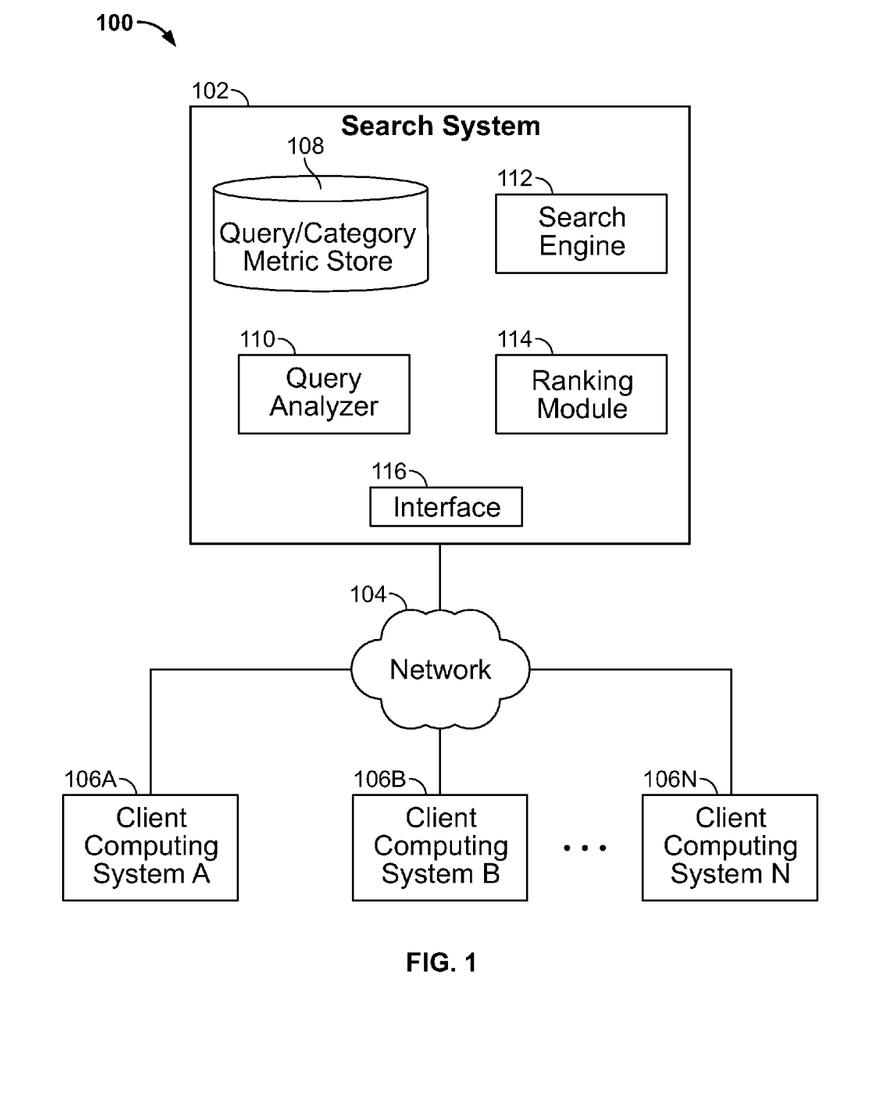
FIG. 1 is a schematic representation of a system that is configured to detect ambiguous search queries.

FIG. 1 is a schematic representation of a system 100 that is configured to detect ambiguous search queries. The system 100 includes a search system 100 that communicates with one or more client computing systems 106A-N (where N is an integer of 1 of more) over a network 104. The network 104 can include one or more local area networks (LANs), a wide area network (WAN), such as the Internet, a wireless network, such as a cellular network, or a combination of all of the above. The client computing systems 106A-N can be various types of computing devices, such as a personal computer, laptop computer, notebook or smartphone to name a few illustrative examples. A search query can be transmitted from a client computing system, e.g., client computing system 106A by way of the network 104 to the search system 102. The search system 102 includes an interface 116 for interfacing with the client computing systems 106A-N.

The query analyzer 110 is configured to analyze the received search query from the client computing system 106A and determine whether or not the search query is an ambiguous search query using information stored in the query/category metric store 108. The query/category metric store 108 includes multiple query/category pairs that are each associated with a metric. The metric for a query/category pair indicates a likelihood that a user is interested in a search result that is responsive to the query in the query/category pair and that is associated with the particular category that is included in the query/category pair.

The search engine 112 is configured to search a corpus of information, e.g., electronic files available to the client computing system 106A over the network 104, for search results that are responsive to a query received from the client computing system 106A. The ranking module 114 is configured to score and rank the search results so that those search results that are determined the most likely to be responsive to the query are presented first in a list of search results presented to the client computing system 106A. Various techniques can be used to score the search results, e.g., based on relevance and otherwise. In one implementation, when a query is determined to be ambiguous, the ranking module 114 can use information from the metric store 108 to disambiguate the query by scoring and ranking the search results. An interface 116 is configured to manage communications between the search system 102 and the client computing systems A-N.

Figure 2:
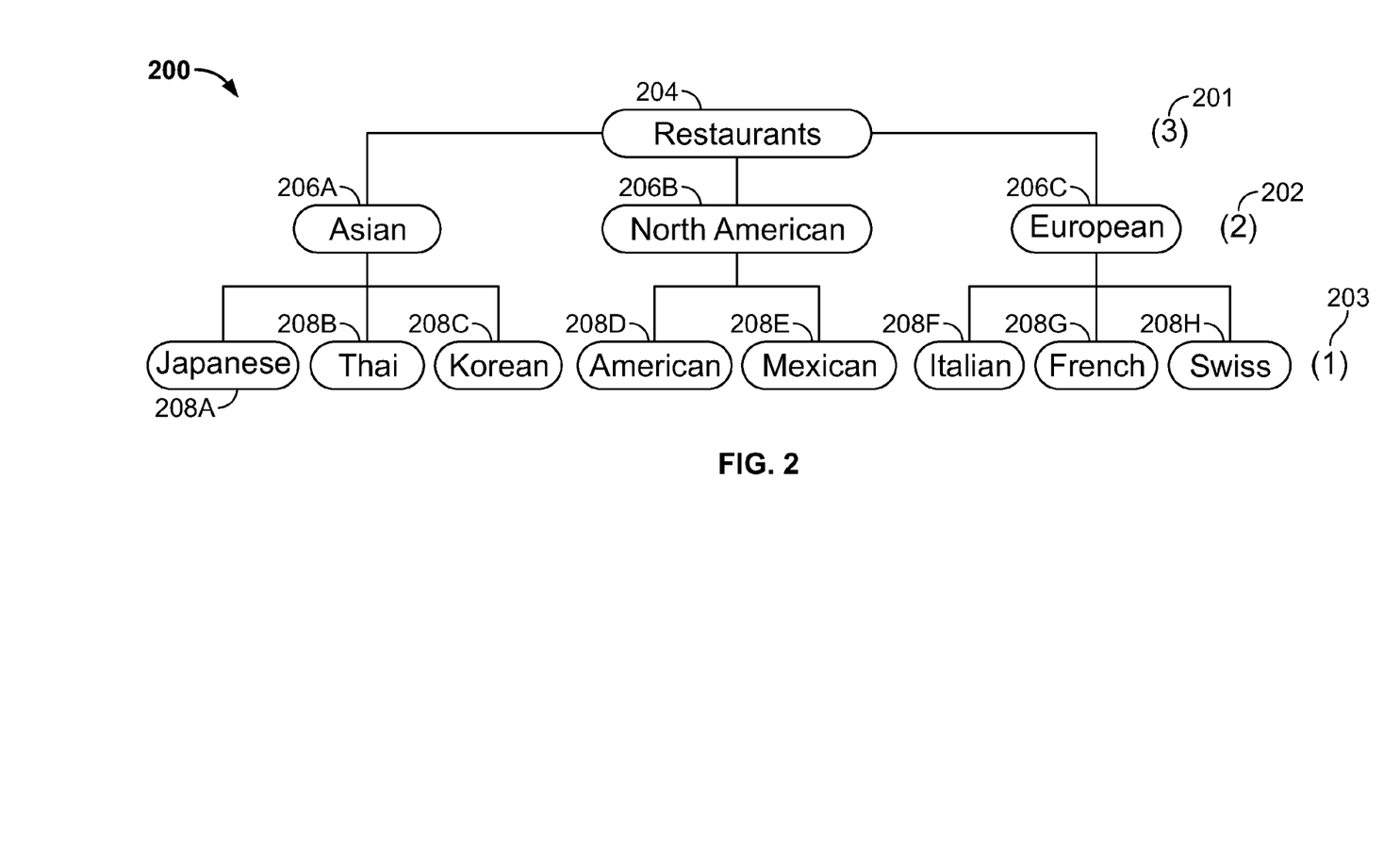
FIG. 2 is a schematic representation of an example hierarchy of categories of information that can be included in search results.

FIG. 2 is a schematic representation of an example hierarchy of categories of information that can be associated with a set of search results. FIG. 2 shows a hierarchy 200 having a highest hierarchical level, i.e., level (3) 201, for the category "Restaurants" 204, three intermediate hierarchical levels (2) for the categories Asian 206A, North American 206B and European 206C restaurants, and eight lowest hierarchical levels (3) for the categories Japanese 208A, That 208B, Korean 208C, American 208D, Mexican 208E, Italian 208F, French 208G and Swiss 208H. FIG. 2 also shows there are three sub-categories at the second level (2) 202 of the category hierarchy 200 (e.g., Asian, North American and European restaurants). Each of these sub-categories is further divided into sub-sub-categories at the lowest hierarchical level, i.e., the first level (1) 203 (e.g., Japanese, That and Korean restaurants under the Asian restaurant sub-category 206A).

Figure 3:
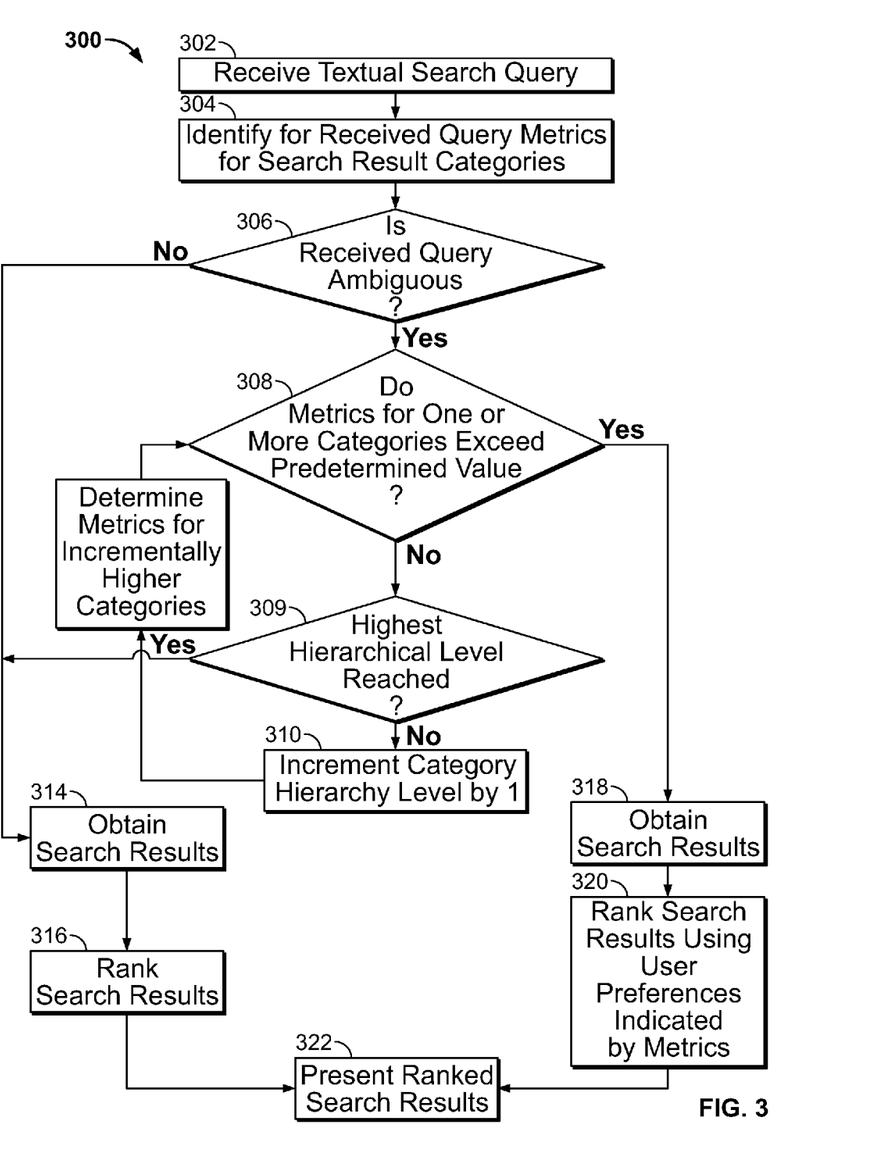
FIG. 3 shows an example process for obtaining search results for an ambiguous query.

FIG. 3 shows an example process 300 for obtaining search results for a query. The example process 300, for illustrative purposes, is described with reference to the example hierarchy of categories 200 shown in FIG. 2. The example process 300 is also described, for illustrative purposes, in the context of the system 100 shown in FIG. 1. However, it should be understood that the process can be implemented using a differently configured system, and the one shown is but one example system.

A search query is received (Step 302). The query can be input by typing or spoken by a user. For example, the search system 102 can receive a search query from the client computing system 106A over the network 104. In this example, the query is "SUSHI". For the particular received query, i.e., "SUSHI", multiple metrics are identified that are associated with multiple categories (Step 304) or query/category pairs.

As mentioned above, each metric is associated with a particular query/category pair and indicates a likelihood that search results that are responsive to the query and associated with the particular category are of interest to a user. Each category can be included in a hierarchy of categories having two or more hierarchical levels, although the categories need not be hierarchical. By way of example, the query analyzer 110 can identify query/category pairs in the query/category metric store 108 that have a query that matches the received query, i.e., that matches SUSHI.

In some implementations, the query analyzer 110 identifies query/category pairs that have a query that is an exact match to the received query. In other implementations, a "match" can be identified even if the queries are not identical, e.g., if the received query is SUSHI RESTAURANT, the query analyzer 110 may still determine that it is a match to a SUSHI/category pair in the query/category metric store. In some implementations, a best matching query found in query/category pairs in the store is identified as the matching query. In some implementations, a limit can be placed on how many terms can differ between the received query and a query included in the store, for example, a maximum of two different terms may be acceptable for a query to qualify as a "match". Queries that have rare terms that match can be preferred.

The metrics can be determined, as explained below, from an analysis of historical data collected from previously received search queries and user-interaction with the search results that were presented in response to the search queries. Each search result can be associated with one or more categories, and each of the one or more categories may represent a level in a hierarchy of categories. Therefore, each search result can provide metrics about one or more query/category combinations corresponding to the one or more categories associated with the search result. In some implementations, the metric is a click-through-rate or is based on a click-through-rate (CTR). In one example, a CTR can be calculated by dividing the number of times a user clicked on a previously presented search result to "click through" to another document (e.g., to another web page) into the total number of times the search result was provided to the user or viewed (i.e., total clicks divided by total page impressions). A relatively high CTR for search results included in a particular category for a given query suggests that search results in the particular category are likely to be of greater interest to the user. The historical CTR can be recorded as the metric for the particular query/category pair in the metric store 108.

In one example, shown in Table 1 below, the following query/category metrics for the query SUSHI can be identified at the lowest level of the category hierarchy 200.

TABLE 1

| Query/Category Pair | Category | Metric (CTR) |
|---|---|---|
| (Sushi, Japanese restaurant) | Japanese restaurant 208A | 35% |
| (Sushi, Thai restaurant) | Thai Restaurant 208B | 30% |
| (Sushi, Italian restaurant) | Italian Restaurant 208F | 13% |
| (Sushi, Mexican restaurant) | Mexican Restaurant 208E | 12% |
| (Sushi, Korean restaurant) | Korean Restaurant 208C | 10% |

The first column in Table 1 shows the query/category pairs in the metric store 108 that match the received query. The second column shows the associated categories as parsed from the query/category pairs. For convenience, reference numbers to the example category hierarchy 200 shown in FIG. 2 are included. The third column shows the metric that is identified for each query/category pair. In this example, based on historical information about user interaction with search results for the query SUSHI, the metric shown in the first row indicates that search results that fell within the "Japanese restaurant" category had a CTR of 35%.

Based on the identified query/category metrics, a determination is made whether the query is ambiguous (Decision Step 306). In some implementations, a query is considered ambiguous if the entropy of categories or category metrics associated with search results that are responsive to the query is large (i.e., if a distribution of categories or category metrics is not sharply peaked). In these implementations, distributions having a large standard deviation are deemed to be ambiguous.

In one implementation, the determination of whether the query is ambiguous is based on analyzing the identified metrics and determining whether one metric is significantly higher than all of the other metrics. For example if the first metric is 90% and each of the other metrics is under 5%, the first metric would be determined to be significantly higher than the other metrics. In such an example, the query is determined not to be ambiguous, since search results falling within the category associated with the first query/category metric are highly likely to be of interest to a user. If no such highly responsive metric is identified, i.e., there is no single metric that is significantly higher than the others, then the query can be determined to be ambiguous.

In some implementations, a metric is determined to be "significantly higher" than the other metrics if the value of the metric is at least 30% higher than each of the other metrics, although in other implementations this can be a different number, e.g., 50%, 100%, etc. For example, as shown in FIG. 2, a query for SUSHI would be considered ambiguous since there is no single metric in the query/category pairs for SUSHI that is at least 30% larger than the value of all of the other metrics. While the metrics for Japanese restaurant and for Thai restaurant are each more than 30% larger than the metrics for the other categories shown in FIG. 2, the metric for the Japanese restaurant category (i.e., 35%) is only about 17% higher than the metric for the Thai restaurant category (i.e., 30%). Accordingly, the SUSHI query is determined to be an ambiguous query at this level of categorization.

If the query is determined not to be ambiguous ("No" branch of Decision Step 306), then the search results are obtained (Step 314) and ranked using conventional scoring and ranking techniques (Step 316). However, if the query is determined to be ambiguous ("Yes" branch of Decision Step 306), then a determination is made whether one or more metrics for one or more query/categories at a given level of the category hierarchy exceeds a predetermined value (Decision Step 308). In one implementation, the predetermined value is a CTR of 40%. If there is no metric in the given category level that exceeds that predetermined value ("No" branch of Decision Step 308), the hierarchical level for each category hierarchy (if any) is incremented by 1 (Step 310) and the metrics are determined for the corresponding categories at the incrementally higher level in the category hierarchy (Step 312). The process of searching for a metric that exceeds the predetermined threshold (Steps 308-312) is then repeated until either a query/category metric is found at some level in the category hierarchy that exceeds the threshold (step 308) or the highest level in the category hierarchy has been reached (step 309).

Referring again to FIG. 2A, for example, all of the categories shown in Table 1 are included in the lowest level of the category hierarchy 200, i.e., level (1). The hierarchical level is incremented by one, i.e., is incremented up to level (2). Each of the following categories roll-up into the Asian restaurant category 206A: Japanese restaurant 208A; Thai Restaurant 208B and Korean Restaurant 208C. The Italian Restaurant category 208F rolls up into the European restaurant category 206C and the Mexican Restaurant category 208E rolls up into the North American category 206B. Metrics are determined for query/category pairs at each of these incrementally-higher level categories, i.e., Asian 206A, North American 206B and European 206C. In some implementations, the metrics are determined by summing the metrics for the associated lower level categories that get rolled up into the incrementally-higher level categories, i.e., by performing an aggregation of the metrics. In other implementations, the query/category metric for the higher level categories may already be stored in the query/category metric store. The new metrics for the level 2 query/category pairs are shown below in Table 2.

TABLE 2

| Category | Metric (CTR) |
| --- | --- |
| Asian 206A | 75% |
| North American 206B | 12% |
| European 206C | 13% |

Repeating steps 308-312 at the higher level, a determination is made whether the metrics for one or more of the incrementally-higher categories exceeds the predetermined threshold value (Step 308). In this example, the metric for the Asian 206A category is 75%, which far exceeds the predetermined threshold value of 40%. As a result, the ambiguous query SUSHI is disambiguated to indicate that users searching for SUSHI prefer to view search results that can be classified as Asian restaurants. This information can then be used to score search results that are responsive to the query SUSHI to emphasize or promote those search results that can be categorized as Asian restaurants over search results that cannot be categorized as Asian restaurants.

Referring back to Decision step 308, if the determination is made that no categories exceed the predetermined value ("No" branch of Decision Step 308), and the highest level of the category hierarchy has been reached ("Yes" branch of Decision Step 309) without having identified a category having a metric that exceeds the predetermined value, the process continues at Step 314, i.e., search results are obtained and ranked using conventional techniques (Step 316) without having disambiguated the categories. In this instance, the scoring and ranking for search results will not be changed to reflect user preference for one or more categories of an ambiguous search category, since no such preference has been determined from the query/category metrics. If the determination is that there are one or more categories having a metric that exceeds the predetermined value ("Yes" branch of Decision Step 308), then a user preference for search results in the one or more categories is identified, i.e., search results that are classified with the one or more categories are preferred. Search results are obtained (Step 318) and ranked based (at least in part) on the identified user preference (Step 320). That is, search results that are included in the one or more categories can be boosted in the ranking as compared to search results that are not included in the one or more categories. In the example system shown, the search results can be obtained by the search engine 112 and ranked by the ranking module 114. It should be understood that obtaining the search results (i.e., Step 314) can occur before or in parallel to the steps 304-312 discussed above. The ranked search results generated at either Step 316 or Step 320 are presented to the user (Step 322).

It is noted that while in the example above, the categories were all included within one category hierarchy, i.e., the hierarchy for "Restaurants", in general query/category pairs identified from the query/category metric store can be associated with categories that are in different category hierarchies. For example, a local query such as "pool, Austin" can be associated with query/category pairs in a restaurant category (e.g., bars with pool tables), in a recreation category (e.g., pool tables), and in a sports category (e.g., swimming pools).

Figure 4:
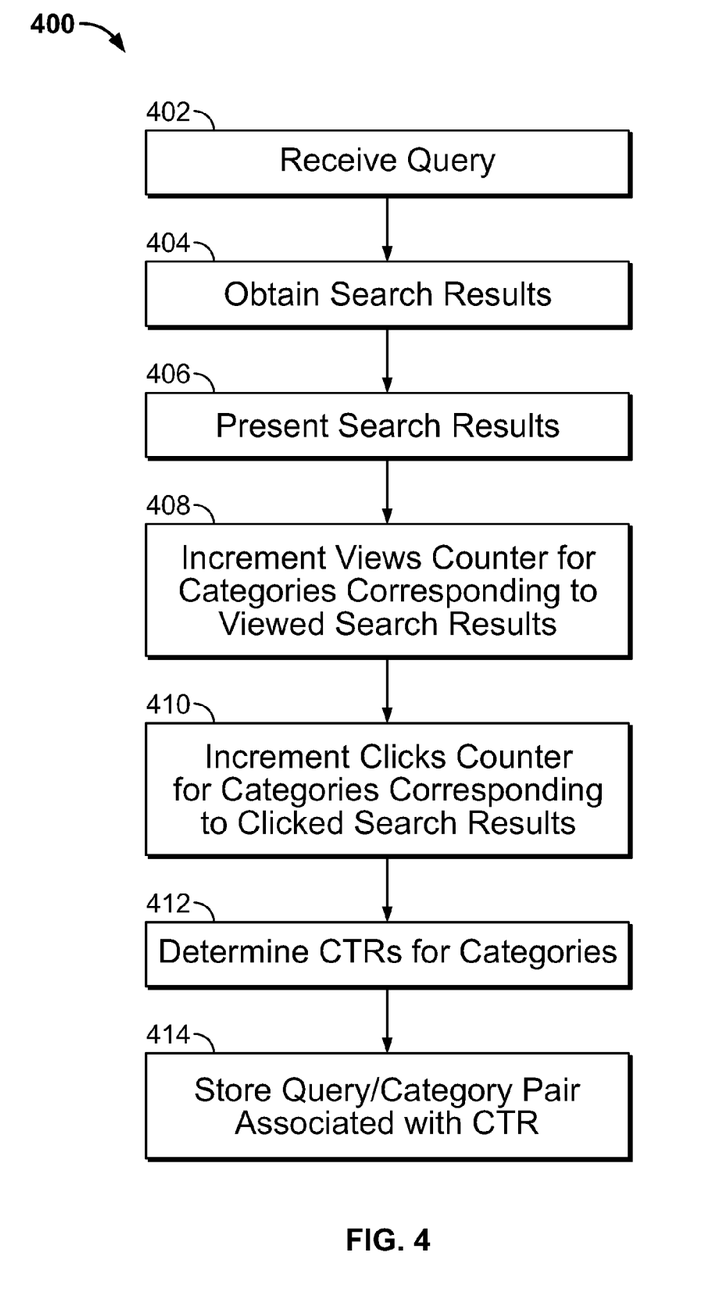
FIG. 4 describes an example process for populating a query/category metric store.

FIG. 4 describes an example process 400 for populating the query/category metric store 108 described above. The process 400 presupposes that information that is obtained in response to a query, e.g., an electronic file which may correspond to a web page or document or otherwise, has been associated with one or more categories. By way of example, in a mapping application, businesses that are included in map results can be obtained from sources such as yellow pages, restaurants guides and the like which are already categorized or indexed by category. The category information from these sources can be used to categorize the business information included in the map results. In another example, web pages can be mined for keywords that can be used to categorize the web pages by matching the key words to particular categories according to a categorization scheme. Other techniques can be used to categorize information presented as a search result.

In process 400, a query is received (Step 402). A set of search results are obtained (Step 404), e.g., from the search engine 112 and ranking module 114. The search results are presented to a user that submitted the query (Step 406), e.g., a user of client computing system 106A. For each search result that is presented to the user, a "views counter" for the one or more categories that the particular search result is associated with is incremented by one (Step 408). The one or more categories can be independent of each other, or can be related to each other in a hierarchy of categories. For each search result that the user clicks on (or other interacts with), i.e., to click through to a landing page, a "clicks counter" for the one or more categories associated with the search result is incremented by one (Step 410). The click-through-rates for the one or more categories that are associated with the set of search results are then calculated by dividing the value of the clicks counter by the value of the views counter for the respective categories, i.e., is a ratio of the number of clicks to the total number of views (Step 412). The query is then paired with each of the one or more categories, and the metrics (e.g., CTR and/or views counter and clicks counter) for each of the query/category pairs are stored in the query/category metric store 108 (Step 414).

The process 400 can be periodically run using historical data logs to insure the freshness of the data and user preferences. Alternatively, the process 400 can be run whenever a query is received, and user interaction data received in response to user interactions with presented search results can be used to update the query/category metrics in metric store 108. In some implementations, the query/category metric store 108 is populated using metrics generated from both historical and real-time data.

In the implementations described above, the metric used is a CTR. However, it should be understood that other metrics can be used that indicate user preferences for search results in a particular category. Examples include a metric that corresponds to the duration of a user interaction with a search result, wherein a longer interaction typically indicates a user preference for categories associated with that search result; and a number of times a user interacts with a search result, wherein the more times a user interacts with the search result the greater the user's preference for categories associated with that search result. Other factors can also be used to indicate a user's preference for one or more categories associated with search results provided in response to a given query, and can be measured and stored as a metric. The ones described herein are but a few illustrative examples.

Figure 5:
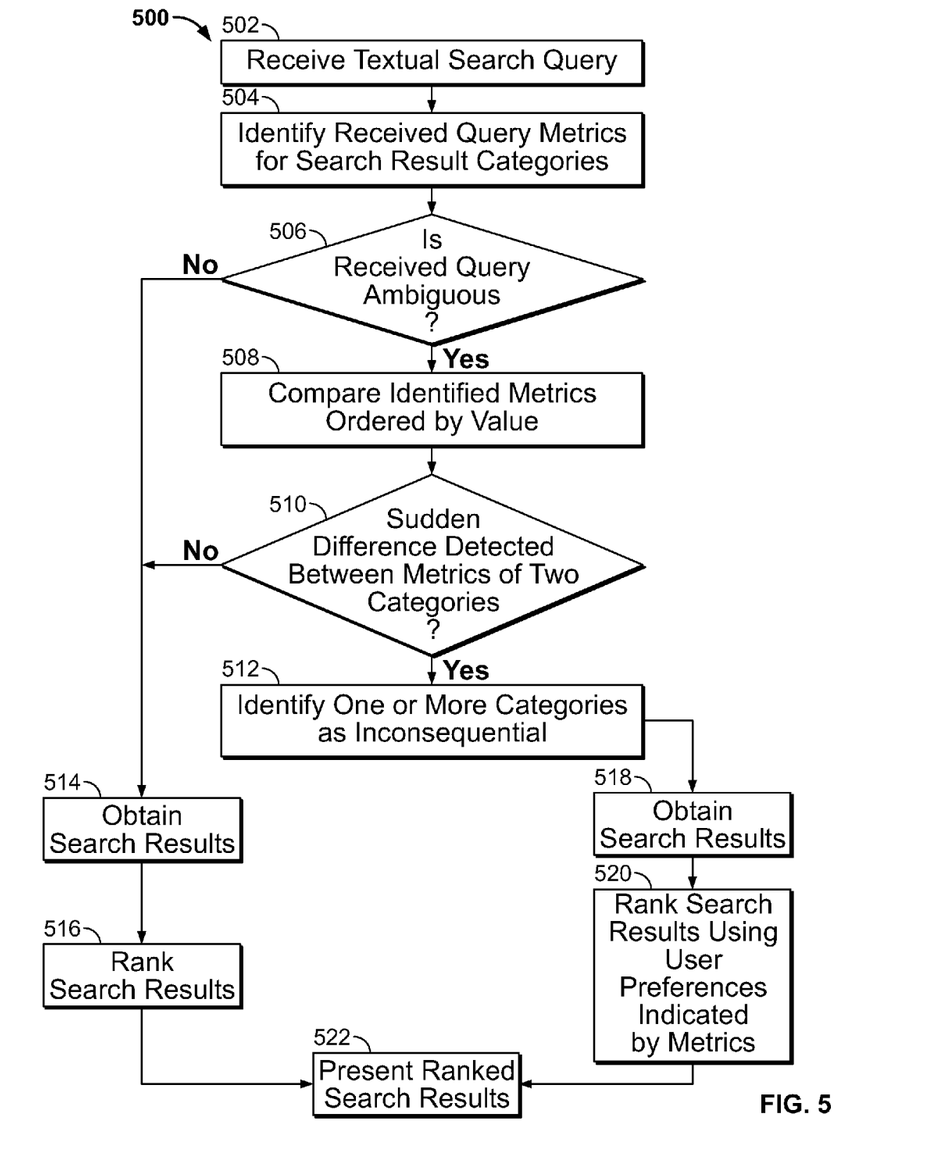
FIG. 5 shows an alternative example process for obtaining search results for an ambiguous query.

FIG. 5 shows an alternative example process for obtaining, scoring, ranking and presenting search results for queries, including ambiguous queries. In process 500 a search query is received (Step 502). For the received query, metrics are identified for query/category pairs whose queries match the received query (Step 504). A determination is made whether the received query is ambiguous (Decision Step 506). As before, the determination can be based on the entropy of categories or category metrics associated with search results that are responsive to the received query. The entropy can be determined, e.g., from distributions of the categories or category metrics, such that distributions having a large standard deviation reflect ambiguous queries.

If the query is determined not to be ambiguous ("No" branch of Decision Step 506), then the search results are obtained (Step 514) and ranked (Step 516) using conventional techniques. If the query is determined to be ambiguous ("Yes" branch of Decision Step 506), then the identified metrics are further analyzed to disambiguate the query. In particular, the metrics for the categories of search results responsive to the query are arranged in a list in order of decreasing metric value, and analyzed to determine whether there is a sharp drop-off in metric values between the metric values associated with any two categories in the list. In some implementations, a drop-off in metric values that is greater than some predetermined number, which can be expressed as a percentage drop-off (e.g., 40%) or an absolute drop-off, indicates a sharp drop-off in metric values.

For example, referring again to the example shown in Table 1, the categories shown in Column 2 are arranged in order of decreasing metric value. The category that is first in order, i.e., Japanese restaurant 208A has the highest value metric of 35%. The next category in order, i.e., That restaurant 208B, has a metric of 30%. Since this is a 15% drop-off from the first metric, it is not a sharp drop-off. The next category in order, i.e., Italian restaurant 208F, has a metric of 13%. Since this is an approximately 57% drop-off in metric value from the second metric, it is considered a sharp drop-off.

Referring again to FIG. 5, if the query is determined to be ambiguous ("Yes" branch of Decision Step 506), the metrics obtained from the query/category metric store 108 corresponding to the received query are compared (Step 508), and analyzed to determine whether a change in metric value between categories that are ordered by decreasing metric value exceed a predetermined threshold value (Decision Step 510). If such a change is determined ("Yes" branch of Decision Step 510), categories that appear below the drop-off are considered inconsequential as there is a strong user preference to NOT view search results associated with such categories (Step 512). Thus, in the example shown in Table 1, the categories of Italian restaurant 208F, Mexican restaurant 208E and Korean Restaurant 208C can be identified as inconsequential because there is a sudden drop-off in metric value between the That restaurant 208B and Italian restaurant 208F categories.

Search results can be obtained (Step 518) and ranked (Step 520) based (at least in part) on the identification of one or more categories as inconsequential. Search results that fall within inconsequential categories can be ignored, or otherwise penalized in their respective scoring for ranking purposes. That is, in some implementations, search results that fall within categories that are identified as inconsequential are ignored, i.e., not presented in the set of search results. In other implementations, the search results are not ignored completely, but their scores for ranking purposes can be negatively impacted by their being associated with an inconsequential category.

In instances where there is no sharp drop-off in metric value between any two categories in the list ("No" branch of Decision Step 510), the search results are obtained (Step 514) and conventionally ranked (Step 516), since no user preference for any one or more search categories over any other search categories has been determined. The ranked search results generated by either Step 516 or Step 520 are presented to the user (Step 522). In some implementations, ambiguous queries can be resolved with a process that combines steps from both process 300 and process 500. For example, if a received query is determined ambiguous in process 300 (i.e., the "Yes" branch of Decision Step 306), then Steps 508, 510 and 512 of process 500 can be undertaken to eliminate certain categories before proceeding to step 308. That is, inconsequential categories can be identified and ignored. The remaining categories can be then considered when determining whether one or more categories exceed a predetermined metric value (i.e., Step 308) at a given level of the category hierarchy.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
  receiving a search query;
  identifying a plurality of categories associated with the search query;
  identifying a plurality of category metrics corresponding to the plurality of categories, wherein a category metric for a category indicates a user preference for search results that are both associated with the category and responsive to the search query;

determining whether the search query is ambiguous based on a distribution of the plurality of metrics; and in response to determining that the search query is ambiguous based on a distribution of the plurality of metrics:
- identifying one or more preferred categories of search results responsive to the search query based on the plurality of category metrics;
- generating a ranked set of search results that are responsive to the search query, wherein generating a ranked set of search results that are responsive to the search query comprises boosting rankings of search results corresponding to one or more preferred categories; and
- providing the ranked set of search results for display to a user.

2. The method of claim 1, wherein the category metric for each category is a click-through-rate determined from historical data for search results previously presented to users in response to queries that match the received search query.

3. The method of claim 1, wherein determining that the search query is ambiguous comprises determining that no category in the plurality of categories has a category metric value that exceeds the category metric values of all of the other categories by a predetermined amount.

4. The method of claim 1, wherein determining that the search query is ambiguous comprises determining that an entropy of the distribution of the plurality of category metrics exceeds a predetermined value.

5. The method of claim 1, wherein identifying one or more preferred categories of search results responsive to the search query comprises identifying one or more of the plurality of categories having category metrics that exceed a predetermined value.

6. The method of claim 1, wherein identifying one or more preferred categories of search results responsive to the search query comprises:
- identifying a drop-off that is greater than a predetermined value exists between two consecutive category metrics in a listing of the category metrics in decreasing numerical order; and
- identifying one or more categories associated with category metrics occurring before the drop-off.

7. A computer-readable storage device encoded with instructions which, when executed by one or more computers, cause the one or more computers to perform operations comprising:
- receiving a search query;
- identifying a plurality of categories associated with search query;
- identifying a plurality of category metrics corresponding to the plurality of categories, wherein a category metric for a category indicates a user preference for search results that are both associated with the category and responsive to the search query;
- determining whether the search query is ambiguous based on a distribution of the plurality of metrics; and
- in response to determining that the search query is ambiguous based on distribution of the plurality of metrics:
  - identifying one or more preferred categories of search results responsive to the search query based on the plurality of category metrics;
  - generating a ranked set of search results that are responsive to the search query, wherein generating a ranked set of search results that are responsive to the search query comprises boosting rankings of search results corresponding to one or more preferred categories; and
  - providing the ranked set of search results for display to a user.

8. The computer-readable storage device of claim 7, wherein the category metric for each category is a click-through-rate determined from historical data for search results previously presented to users in response to queries that match the received search query.

9. The computer-readable storage device of claim 7, wherein determining that the search query is ambiguous comprises determining that no category in the plurality of categories has a category metric value that exceeds the category metric values of all of the other categories by a predetermined amount.

10. The computer-readable storage device of claim 7, wherein determining that the search query is ambiguous comprises determining that an entropy of the distribution of the plurality of category metrics exceeds a predetermined value.

11. The computer-readable storage device of claim 7, wherein identifying one or more preferred categories of search results responsive to the search query comprises identifying one or more of the plurality of categories having category metrics that exceed a predetermined value.

12. The computer-readable storage device of claim 7, wherein identifying one or more preferred categories of search results responsive to the search query comprises:
- identifying a drop-off that is greater than a predetermined value exists between two consecutive category metrics in a listing of the category metrics in decreasing numerical order; and
- identifying one or more categories associated with category metrics occurring before the drop-off.

13. A computer-implemented system comprising:
- one or more computers;
- one or more data storage devices coupled to the one or more computers and storing instructions that, when executed by the one or more computers, cause the one or more computers to perform operations comprising:
- receiving a search query;
- identifying a plurality of categories associated with the search query; and
- identifying a plurality of category metrics corresponding to the plurality of categories, wherein a category metric for a category indicates a user preference for search results that are both associated with the category and responsive to the search query;
- determining whether the search query is ambiguous based on a distribution of the plurality of metrics; and
- in response to determining that the search query is ambiguous based on a distribution of the plurality of metrics:
  - identifying one or more preferred categories of search results responsive to the search query based on the plurality of category metrics;
  - generating a ranked set of search results that are responsive to the search query, wherein generating a ranked set of search results that are responsive to the search query comprises boosting rankings of search results corresponding to one or more preferred categories; and
  - providing the ranked set of search results for display to a user.

14. The system of claim 13, wherein the category metric for each category is a click-through-rate determined from historical data for search results previously presented to users in response to queries that match the received search query.

15. The system of claim 13, wherein determining that the search query is ambiguous comprises determining that no category in the plurality of categories has a category metric value that exceeds the category metric values of all of the other categories by a predetermined amount.

16. The system of claim 13, wherein determining that the search query is ambiguous comprises determining that an entropy of the distribution of the plurality of category metrics exceeds a predetermined value.

17. The system of claim 13, wherein identifying one or more categories of search results responsive to the search query comprises identifying one or more plurality of categories having category metrics that exceed a predetermined value.

18. The system of claim 13, wherein identifying one or more preferred categories of search results responsive to the search query comprises:
    identifying a drop-off that is greater than a predetermined value exists between two consecutive category metrics in a listing of the category metrics in decreasing numerical order; and
    identifying one or more categories associated with category metrics occurring before the drop-off.

* * * * *